UNITED STATES PATENT OFFICE.

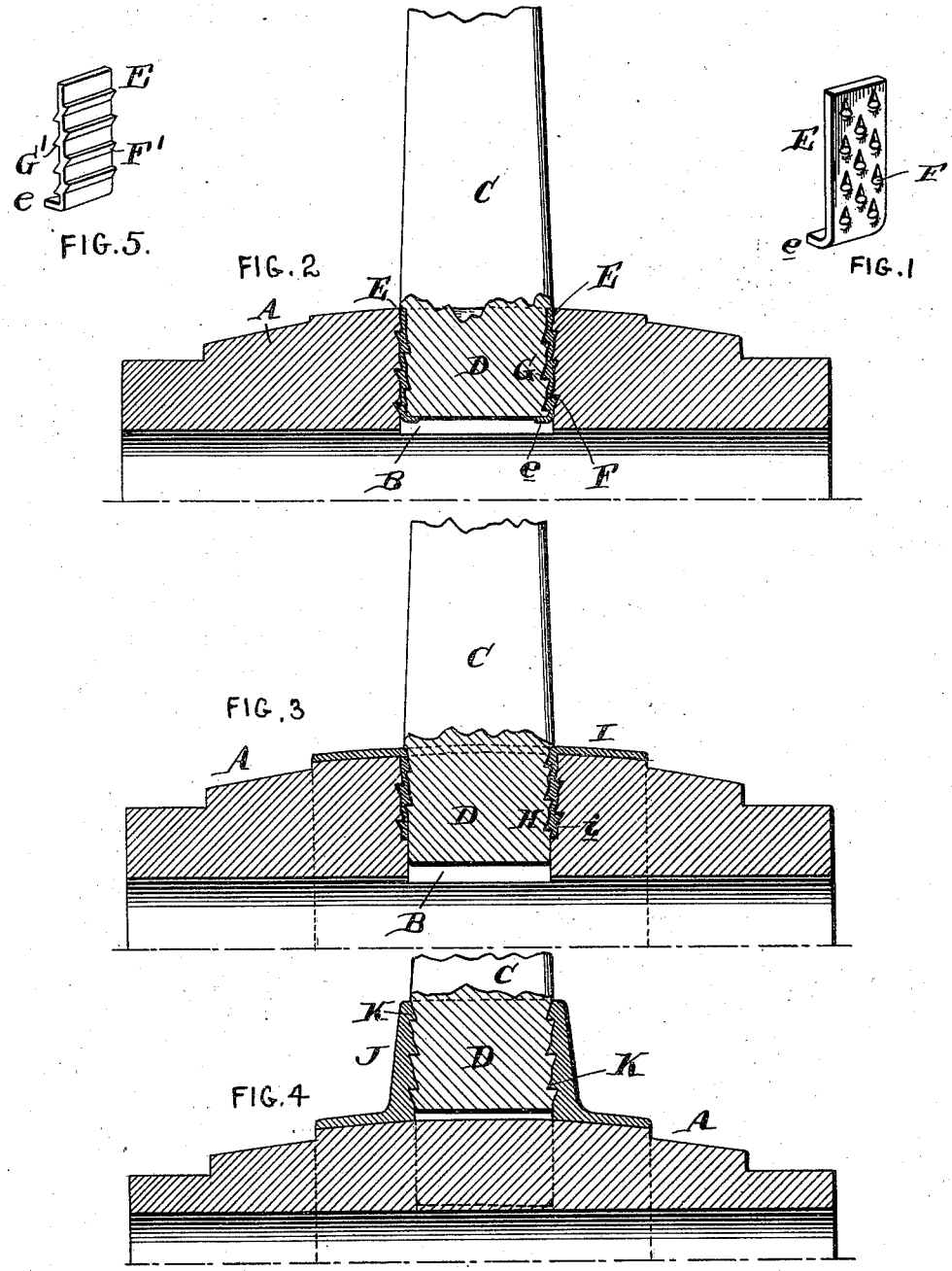
C. L. SCHWARZ.
SPOKE FASTENER FOR WHEELS.
No. 545,916. Patented Sept. 10, 1895.

CHARLES L. SCHWARZ, OF PHILADELPHIA, PENNSYLVANIA.

SPOKE-FASTENER FOR WHEELS.

SPECIFICATION forming part of Letters Patent No. 545,916, dated September 10, 1895.

Application filed September 11, 1894. Serial No. 522,685. (No model.)

*To all whom it may concern:*

Be it known that I, CHARLES L. SCHWARZ, of the city and county of Philadelphia, State of Pennsylvania, have invented an Improvement in Devices for Fastening Spokes in Wheels, of which the following is a specification.

My invention has reference to the construction of vehicle-wheels; and it consists of certain improvements which are fully set forth in the following specification and shown in the accompanying drawings which form a part thereof. Heretofore there has been great difficulty with wheels made wholly or partly of wood, owing to the fact that the spokes in time become loose in the hub and are rapidly destroyed if said looseness is permitted to continue.

The object of my invention is to permit a perfect repair of defective wheels, and also to so construct the wheels in the first instance that they shall be far more durable and the spokes shall be prevented from coming loose in the hub. In the case of all-wood wheels—that is to say, those in which all of the hub and spokes are of wood—I employ independent metal locking-pieces which are provided with lateral projections adapted to project into the wall of the hub and wall of the tenon of the spoke when the latter is driven into the hub. In those constructions of wheels in which a thin metallic band is placed about the hub, and especially in hubs of very small diameters, I prefer to form the metallic locking-pieces integral with the metallic band and provide them with projections adapted to extend into the tenon of the spoke. In another construction of wheels found on the market, and especially adapted to carts, the wooden hub is surrounded with a deep cast-steel band into which the tenons of the spokes are driven, and the spoke-tenons may or may not enter the wooden part of the hub, as desired. In this case I form the inner walls of the metallic sockets for the tenons of the spokes with the inwardly-projecting portions adapted to catch upon the tenons to prevent their withdrawal. The projections when employed to act upon the tenon of the spoke are formed preferably like inclined teeth, which permit the spoke to be driven in but lock it against being drawn out. When the locking-piece is provided with projections to catch upon the wood of the hub, the said projections or teeth are reversed so that the locking-piece may be easily driven into place but cannot be withdrawn.

My invention will be better understood by reference to the accompanying drawings, in which—

Figure 1 is a perspective view of one of my locking-pieces. Fig. 2 is a sectional elevation showing the construction of an all-wood wheel with my improvement applied thereto. Figs. 3 and 4 show modifications thereof when metallic bands are employed about the wooden hub. Fig. 5 is a perspective view of a modification of my locking-piece; and Fig. 6 is a sectional elevation of my locking-piece, showing another way of forming the teeth or projections.

A is the wooden hub.

C is the spoke, and D is the tenon thereof. Referring to Figs. 1 and 2, the tenon D of the spoke is driven into the socket B formed in the hub.

E are metallic locking-pieces and are formed of sheet metal with the lateral projections or teeth F G formed upon the faces thereof, preferably by a construction somewhat similar to a wood rasp—that is to say, in which the teeth are driven up out of the body of the metal by suitable dies forming teeth, into the pockets and back of the teeth of which the wood may catch to take a firm hold. The teeth are preferably practically straight upon one face and inclined upon the other, so that they are easily driven in, but cannot be withdrawn. The teeth upon the opposite sides of the plate F are pointed in opposite directions, so that one set of teeth hold the plates to the hub and the other set of teeth hold the tenon to the plate. The lower end of the plates may be bent over, as at *e*, so as to form a shoulder to fit under the tenon to more readily facilitate the driving in of the plates E when inserting the spoke-tenon. After the tenon of the spoke is driven into the hub it is practically impossible to withdraw it without completely destroying it. The spoke under no circumstances will become loose under ordinary actions of the wheel. It is evident that these plates E may be upon opposite faces of the tenon or upon one face only. I prefer to employ them so as to lie at right angles to the grain of the wood in the hub, since a better hold is thereby secured without danger of splitting the hub. If desired, the teeth may be formed all the way across the plate, as at F' and G' in Fig 5.

In the construction shown in Fig. 3 the hub A is provided with an annular band I, of metal, and usually of cast-steel or wrought-iron. In place of completely cutting out the apertures, as is customary, through which to pass the tenons of the spokes, the metal may be bent downward and have the inner faces provided with the inwardly-projecting teeth so as to lock the tenon of the spoke into position when once driven in. In this construction $i$ represents the portion of the metal which is bent inward and downward into the socket B of the hub, and H represents the inwardly-projecting teeth, adapted to hold the tenon of the spoke. It is evident that in this case the annular band I acts to hold the metal walls $i$ in position in the wooden hub, and hence in this construction the projections or teeth corresponding to F in Fig. 1 may be omitted, if desired.

In the construction shown in Fig. 4 the heavy metal band J is provided upon the inner face with teeth or projections K, which are adapted to hold the tenon D of the spoke C.

As shown in Fig. 6 the locking-plate has the teeth $F^2$ and $G^2$ driven up by suitable dies, and this is the cheapest method of manufacture. It is to be understood that the teeth or projections may be of any shape desired; but I prefer them as about set out.

All of these constructions illustrated embody the broad features of my invention, consisting of a metallic locking-piece carried by a wooden hub and provided with inwardly-projecting teeth which prevents the withdrawal of the spoke; but in practice I prefer the construction shown in Figs. 1, 2, 5, and 6 as being the cheapest and most easily applied.

What I claim as new, and desire to secure by Letters Patent, is—

1. In a vehicle wheel, the combination with the socketed hub and spokes having their tenons fitted in said socket, of an interposed metal locking plate between the hub socket and spoke tenon provided upon its two faces with oppositely inclining projections, those of one face entering the wood of the tenon, and those on the other face entering the wood of the hub socket.

2. A locking plate for securing a spoke tenon to a hub consisting of a flat plate having teeth projecting from the faces thereof and pointing in opposite directions, the said teeth on one face being inclined upward and at the other face inclined downward, and a shoulder formed at one end of said plate adapted to receive the end of the spoke tenon.

In testimony of which invention I have hereunto set my hand.

CHARLES L. SCHWARZ.

Witnesses:
R. M. HUNTER,
ERNEST HOWARD HUNTER.